(12) United States Patent
Morikawa et al.

(10) Patent No.: US 7,440,161 B2
(45) Date of Patent: Oct. 21, 2008

(54) OPTICAL ELEMENT AND METHOD FOR FORMING DOMAIN INVERSION REGIONS

(75) Inventors: Akihiro Morikawa, Osaka (JP); Tomoya Sugita, Osaka (JP); Kiminori Mizuuchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 137 days.

(21) Appl. No.: 10/593,866

(22) PCT Filed: Mar. 15, 2005

(86) PCT No.: PCT/JP2005/004520

§ 371 (c)(1),
(2), (4) Date: Sep. 22, 2006

(87) PCT Pub. No.: WO2005/091066

PCT Pub. Date: Sep. 29, 2005

(65) Prior Publication Data

US 2007/0216990 A1    Sep. 20, 2007

(30) Foreign Application Priority Data

Mar. 24, 2004  (JP) ............................. 2004-086230

(51) Int. Cl.
  *G02F 1/35* (2006.01)
(52) U.S. Cl. ...................... 359/326; 385/122
(58) Field of Classification Search ......... 359/326–330; 385/122, 11
  See application file for complete search history.

(56) References Cited

U.S. PATENT DOCUMENTS 5,568,308 A    10/1996  Harada

| 5,652,674 A | * | 7/1997 | Mizuuchi et al. ............. 359/326 |
| 5,756,263 A | * | 5/1998 | Gupta et al. ................. 430/317 |
| 5,838,486 A | | 11/1998 | Sonoda et al. |
| 5,943,465 A | * | 8/1999 | Kawaguchi et al. .......... 385/122 |
| 6,900,928 B2 | | 5/2005 | Lin et al. |

FOREIGN PATENT DOCUMENTS

| JP | 3-121428 | 5/1991 |
| JP | 4-19719 | 1/1992 |
| JP | 6-242478 | 9/1994 |
| JP | 7-281224 | 10/1995 |
| JP | 9-218431 | 8/1997 |
| JP | 2000-147584 | 5/2000 |
| JP | 2001-66652 | 3/2001 |
| JP | 2003-57697 | 2/2003 |
| JP | 2003-307758 | 10/2003 |

OTHER PUBLICATIONS

Chinese Office Action (along with English language translation) issued in Chinese Application No. 200580003045.3 issued Oct. 12, 2007.

* cited by examiner

*Primary Examiner*—Hemang Sanghavi
(74) *Attorney, Agent, or Firm*—Wenderoth, Lind & Ponack, L.L.P.

(57) ABSTRACT

There is provided a stable optical element having a fine, uniform, and wide-ranging domain inversion structure in a ferroelectric crystal. This includes a plurality of domain inversions (101) formed on an $MgO:LiNbO_3$ substrate (100), and a groove (102) formed on the substrate surface between the domain inversions (101). The depth T' of substantially all of the domain inversions (101) satisfies the relation T'<T with respect to the substrate thickness T.

34 Claims, 10 Drawing Sheets

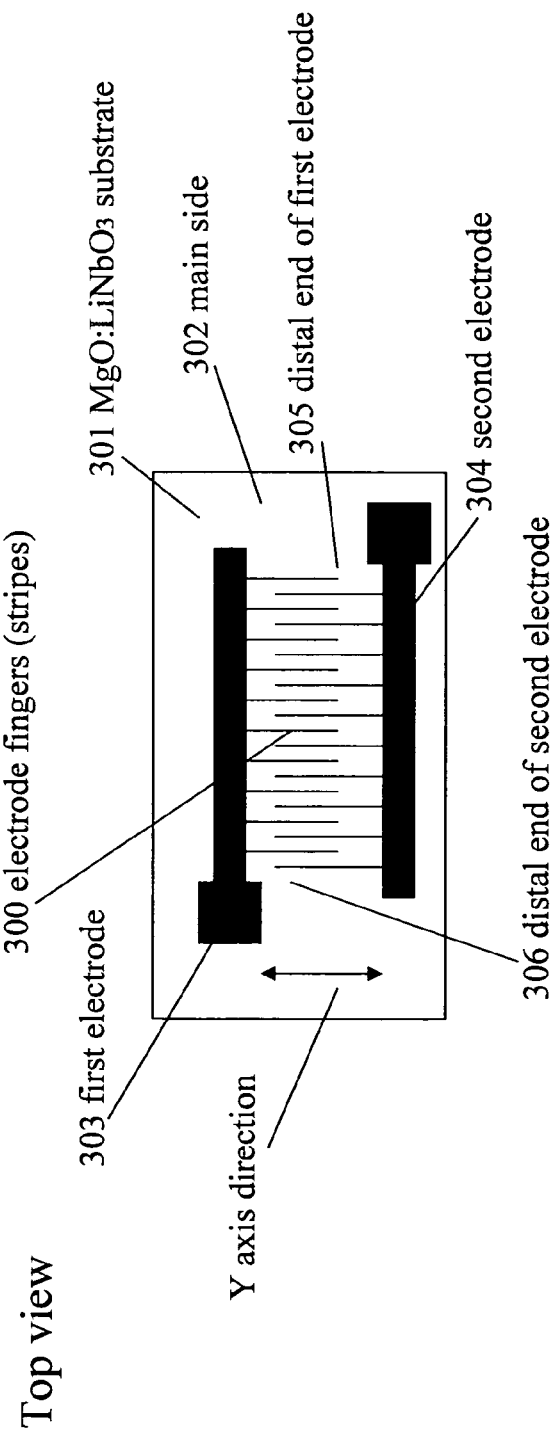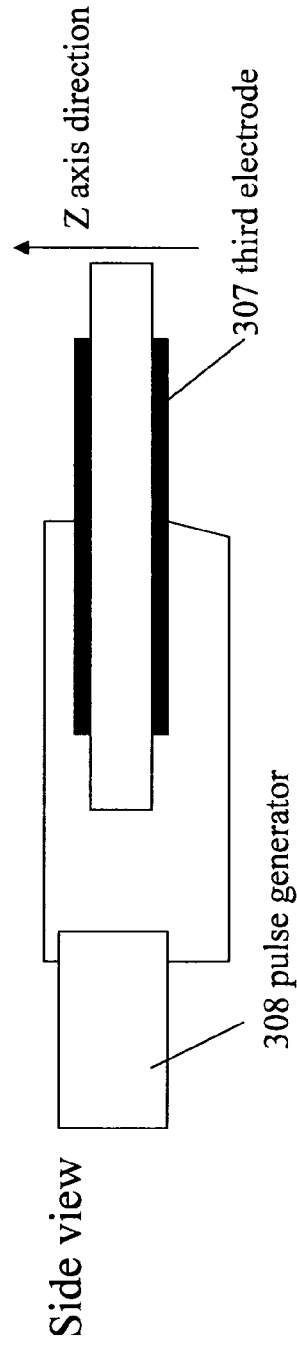
Fig. 3a
Fig. 3b

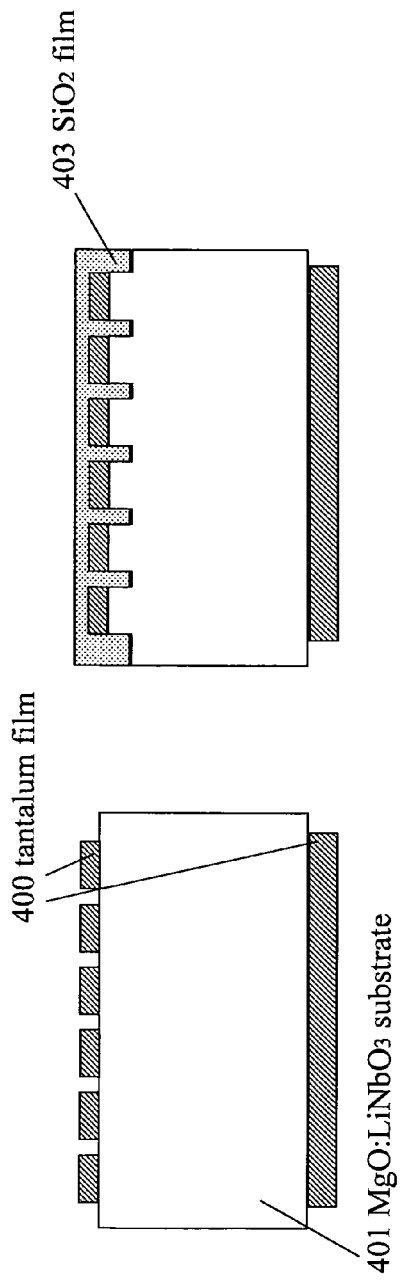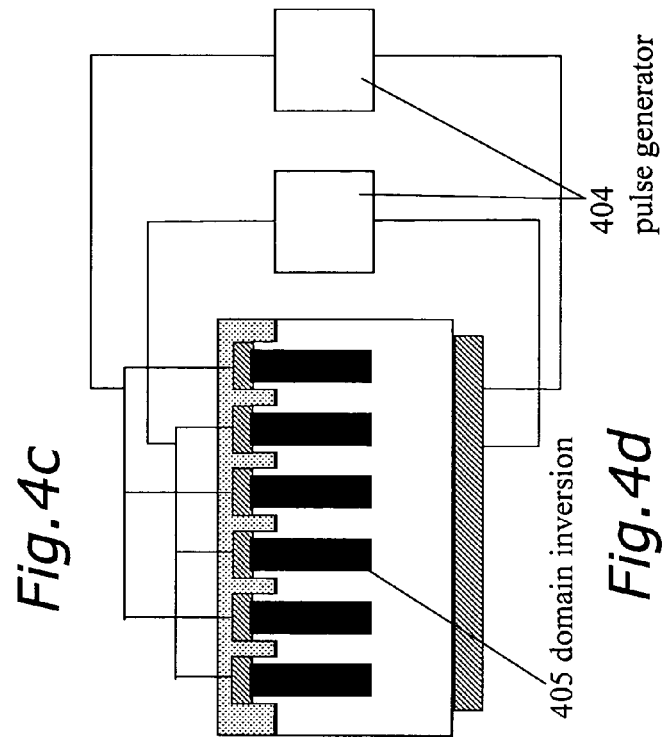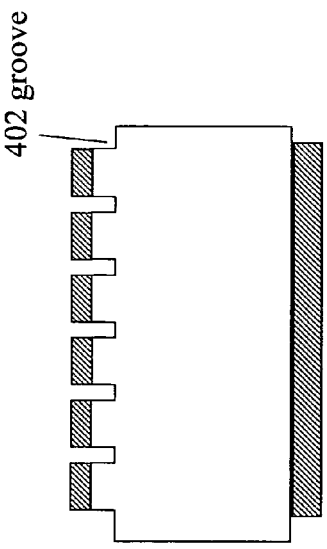
Fig.4a
Fig.4b
Fig.4c
Fig.4d
400 tantalum film
401 MgO:LiNbO₃ substrate
402 groove
403 SiO₂ film
404 pulse generator
405 domain inversion $V_2 > V_1 > V_3$ When L₁ is large When L₁ is small

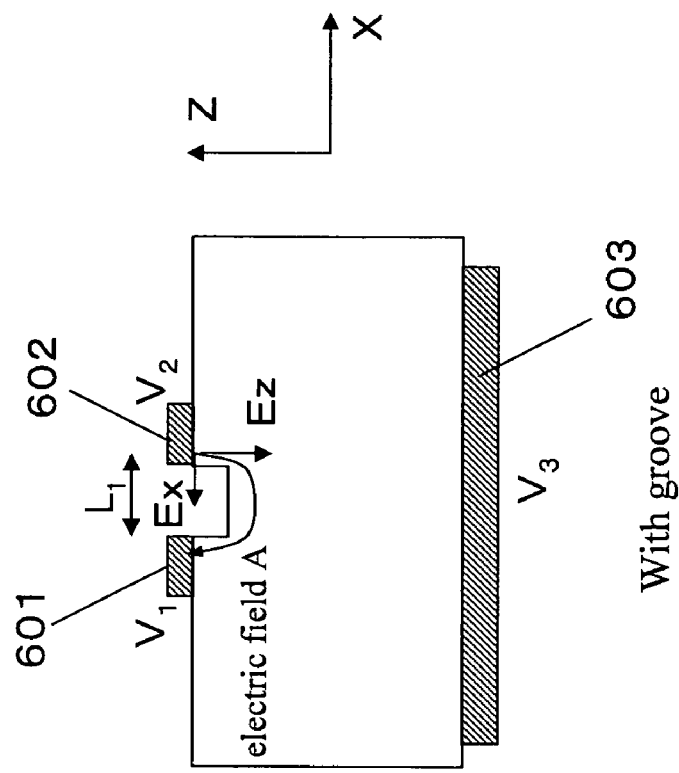
*Fig.6b* With groove
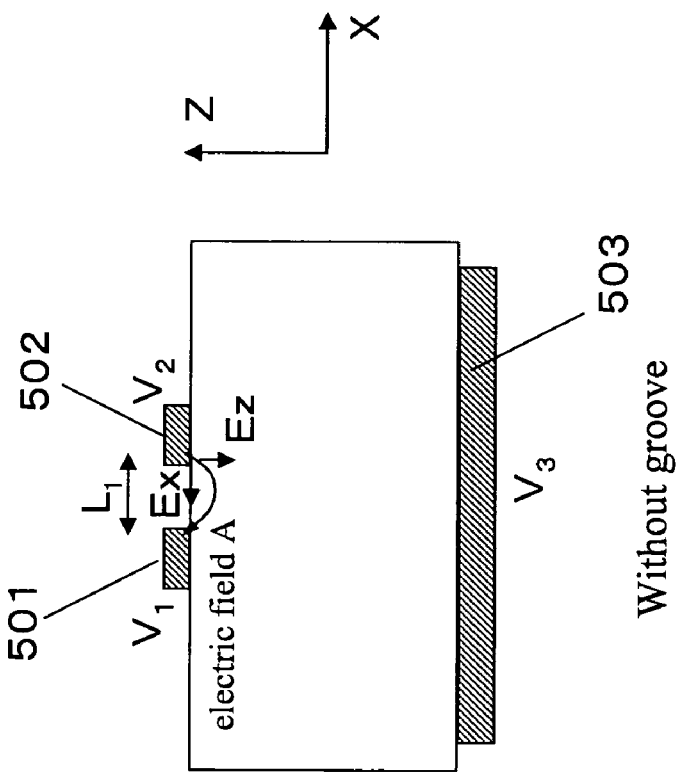
*Fig.6a* Without groove

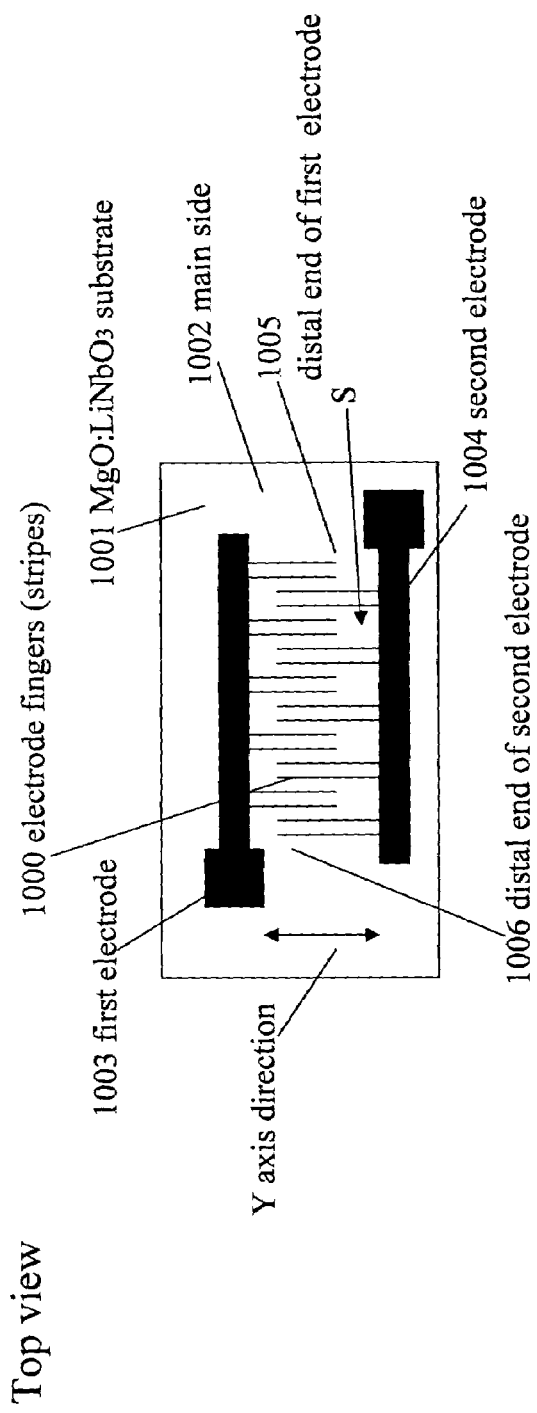
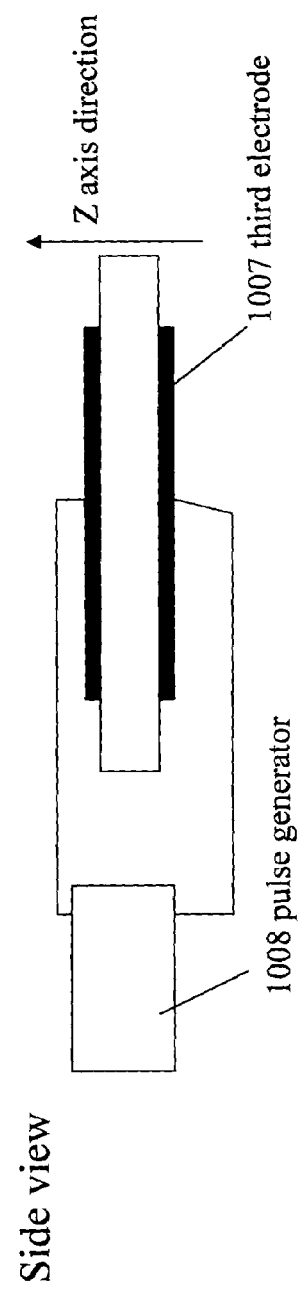

OPTICAL ELEMENT AND METHOD FOR FORMING DOMAIN INVERSION REGIONS

TECHNICAL FIELD

The present invention relates to an optical element, and more particularly to an optical element furnished with domain inversion regions. The present invention also relates to a method for forming domain inversion regions.

BACKGROUND ART

Domain inversion, which is a phenomenon whereby the polarization of a ferroelectric is forcibly inverted, can be utilized to form periodic domain inversion regions (domain inversion structures) in the interior of a ferroelectric. The domain inversion regions thus formed are used in optical frequency modulators that make use of surface elastic waves, optical wavelength conversion elements that make use of the inversion of nonlinear polarization, optical polarizers that make use of a prism- or lens-shaped inversion structure, and the like. In particular, if the nonlinear polarization of a nonlinear optical substance could be periodically inverted, it would be possible to produce optical wavelength conversion elements of extremely high conversion efficiency. If these could be used to convert the light from semiconductor lasers and so forth, it would be possible to obtain a compact short-wavelength light source that could be applied to printing, optical information processing, applied lasermetrics, and other such fields.

Methods that have been reported in the past for forming periodic domain inversion regions include a method involving the thermal diffusion of titanium, a method in which $SiO_2$ is loaded and then heat treated, and a method in which proton exchange and heat treatment are performed. Meanwhile, another has been reported for forming periodic domain inversion regions by taking advantage of the face that the spontaneous polarization of a ferroelectric is inverted by an electric field. Methods involving this electric field include, for example, a method in which the −C plane of a substrate cut along the C axis is irradiated with an electron beam, and a method in which the +C plane is irradiated with positive ions. In either case, domain inversion regions with a depth of a few hundred microns are formed by the electric field formed by irradiation with charged particles.

Another conventional method for manufacturing domain inversion regions that has been reported is to form an interdigital electrode on an $LiNbO_3$ substrate and applying a pulsed electric field to this (see Japanese Laid-Open Patent Application H3-121428 and Japanese Laid-Open Patent Application H4-19719, for example). With these methods, a periodic interdigital electrode is formed on the +C plane of the $LiNbO_3$ substrate, and a flat electrode is formed on the −C plane. The +C plane is then grounded, and pulse voltage, typically with a pulse width of 100 μs, is applied to the −C plane by a pulsed light source and thereby apply a pulsed electric field to the substrate. The electric field that is required to invert polarization is approximately 20 kV/mm or higher. In the application of an electric field of this value, there is the possibility that the substrate may be damaged by the field if the substrate is too thick. If the thickness of the substrate is kept to about 200 μm, however, crystal damage by field application can be avoided, and it will be possible to form domain inversion regions at room temperature. A deep domain inversion structure that goes all the way through the substrate is obtained.

It has also been disclosed that a periodic domain inversion structure can be formed by forming an interdigital electrode on a Z-cut magnesium-doped $LiNbO_3$ substrate (hereinafter referred to as MgLN), and applying voltage to this (see Japanese Laid-Open Patent Application 2001-66652, for example).

To increase the efficiency of an optical wavelength conversion element, a short-period domain inversion structure with a period of 3 to 4 μm is necessary. When domain inversion regions are formed by the application of an electric field, after the polarization is inverted directly under the electrode, the domain inversion regions spread out parallel to the surface of the substrate. This makes it difficult to shorten the period of the domain inversion structures. To solve this problem, with a conventional method, a brief pulse of voltage, with a pulse width of about 100 μs, is applied, which shortens the voltage application time and forms a short-period domain inversion structure.

Another known method for forming a short-period domain inversion structure is to form a groove on the surface of a Z-cut $LiTaO_3$ substrate to suppress the expansion of the domain inversion in the lateral direction, and thereby form domain inversion regions with a period of 3.8 μm (see Japanese Laid-Open Patent Application 2000-147584, for example).

Yet another method for forming a short-period domain inversion structure is to form domain inversion regions separately by dividing up into a plurality of domains in order to form domain inversion microstructures within a dielectric material, and thereby form short-period domain inversion at a period of 4 μm, for example (see Japanese Laid-Open Patent Application 2003-307758, for example).

A method in which a short-period domain inversion structure is formed in MgLN has also been proposed (see Japanese Laid-Open Patent Application H6-242478, for example). With this method, a periodic domain inversion structure is formed in Z-cut MgLN. More specifically, with this method, an interdigital electrode is formed in the +Z plane of MgLN, and corona irradiation is performed from the back to form a periodic domain inversion structure. The result is a domain inversion structure in which the period is 4 μm and the structure goes all the way through the substrate thickness of 0.5 mm.

Another known method is to sandwich an $SiO_2$ film between the −Z plane of Z-cut MgLN and an electrode, which prevents damage to the substrate and forms a domain inversion structure that goes all the way through the substrate thickness of 0.3 mm at a period of 5 μm (see Japanese Laid-Open Patent Application H7-281224, for example).

A method in which a domain inversion structure is formed in off-cut MgLN has also been proposed (see Japanese Laid-Open Patent Application H9-218431, for example). With this method, an electrode is formed on an off-cut substrate, and voltage is applied to this, which allows a needle-like domain inversion structure to be formed. The domain inversion structure grows in the direction of polarization of the crystals. A domain inversion structure with a period of about 5 μm can be formed in an off-cut MgLN substrate. The domain inversion is formed in a needle shape in the interior of the substrate, using an off-cut substrate in which the polarization direction has been slightly tilted from the substrate surface.

SUMMARY OF THE INVENTION

Problems which the Invention is Intended to Solve

A problem encountered with prior art was the difficulty of forming fine, stable domain inversion regions in a Z-cut magnesium-doped $LiTa_{(1-x)}Nb_xO_3$ ($0 \leq x \leq 1$) substrate.

For example, with prior art, it is possible to form domain inversion by electric field application in an off-cut substrate. Nevertheless, with a Z-cut substrate, it is difficult to form a uniform and fine inversion structure unless a complicated electric field application process such as corona poling is performed. The term corona poling here refers to a method for inverting polarization by depositing charged particles on a substrate to generate an electric field. With this method, there is a limit to how large an electric field can be generated with charged particles, so the thickness of the substrate in which domain inversion can be formed is limited to about 0.5 mm, and forming domain inversion in a thicker substrate of over 1 mm is very difficult.

As discussed above, methods in which voltage is applied by an electrode are effective at forming inversion in an off-cut substrate, but a problem is that it is difficult to form domain inversion in Z-cut.

In contrast, there is a known method in which an interdigital electrode is formed in Z-cut MgLN and voltage is applied to this, thereby forming a periodic domain inversion structure. An advantage of this prior art is that a periodic domain inversion structure can be formed uniformly. Nevertheless, domain inversion formed by this prior art is limited to just the portions at the distal ends of the electrode. Consequently, it remains difficult to form a domain inversion structure over a wide area under an electrode.

In view of this, it is an object of the present invention to provide an optical element furnished with domain inversion regions that are short in period and broad in range, and to provide a method for forming domain inversion regions that are short in period and broad in range.

Means Used to Solve the Above-Mentioned Problems

The optical element pertaining to the present invention includes a single-polarized ferroelectric substrate, a plurality of domain inversion regions formed in the ferroelectric substrate and a groove formed on the surface of the ferroelectric substrate between the domain inversion regions. The depth T' of at least one of the domain inversion regions satisfies the relation T'<T with respect to the substrate thickness T. This achieves the stated object.

The method for forming domain inversion regions pertaining to the present invention is a method for forming domain inversion regions in the interior of a single-polarized ferroelectric crystal substrate, including the steps of providing a groove to the surface of the ferroelectric substrate and dividing the surface of the ferroelectric substrate into a plurality of regions, and applying an electric field to the plurality of regions and forming domain inversion regions. The direction of the electric field is a direction facing the spontaneous polarization of the ferroelectric substrate, and in the step of applying the electric field, a potential difference is produced in the plurality of regions.

Effect of the Invention

With the optical element of the present invention, a groove is formed in the domain inversion regions. Furthermore, at least one of the domain inversion regions does not go all the way through the substrate. The above structure makes it possible to provide an optical element furnished with domain inversion regions that are short in period and broad in range. Specifically, electric field application can be suitably performed in the step of forming the domain inversion regions, for example, because there is a domain inversion region that does not go all the way through the substrate and there is a groove. This means that even when fine (short-period) domain inversion regions are formed, it is still possible to form the domain inversion regions uniformly and over a broad range.

Also, with the method of the present invention for forming domain inversion regions, domain inversion regions are formed in a plurality of regions divided up by a groove. Further, the direction of the electric field is a direction facing the spontaneous polarization of the ferroelectric substrate, and a potential difference is produced in the plurality of regions in the step of applying the electric field. The above structure makes it possible to form domain inversion regions that are short in period and broad in range. Specifically, with the above structure, electric field application can be suitably performed in the step of forming the domain inversion regions. This means that even when fine (short-period) domain inversion regions are formed, it is still possible to form the domain inversion regions uniformly and over a broad range.

An additional effect is that employing this method makes it possible to manufacture an optical element such as a wavelength conversion element for generating ultraviolet light.

BRIEF DESCRIPTION OF THE DRAWINGS

FIG. 3 illustrates the method for forming domain inversion regions in Embodiment 2, with FIG. 3a being a top view and FIG. 3b a side view;

FIG. 4 consists of cross sections of the method for forming domain inversion regions in Embodiment 2;

FIG. 6a is an electric field distribution diagram when there is no groove, and FIG. 6b is an electric field distribution diagram when there is a groove, both in the method for forming domain inversion regions in Embodiment 2;

FIG. 10 illustrates the method for forming domain inversion regions in Embodiment 3, with FIG. 10a being a top view and FIG. 10b a side view;

Figure 1:
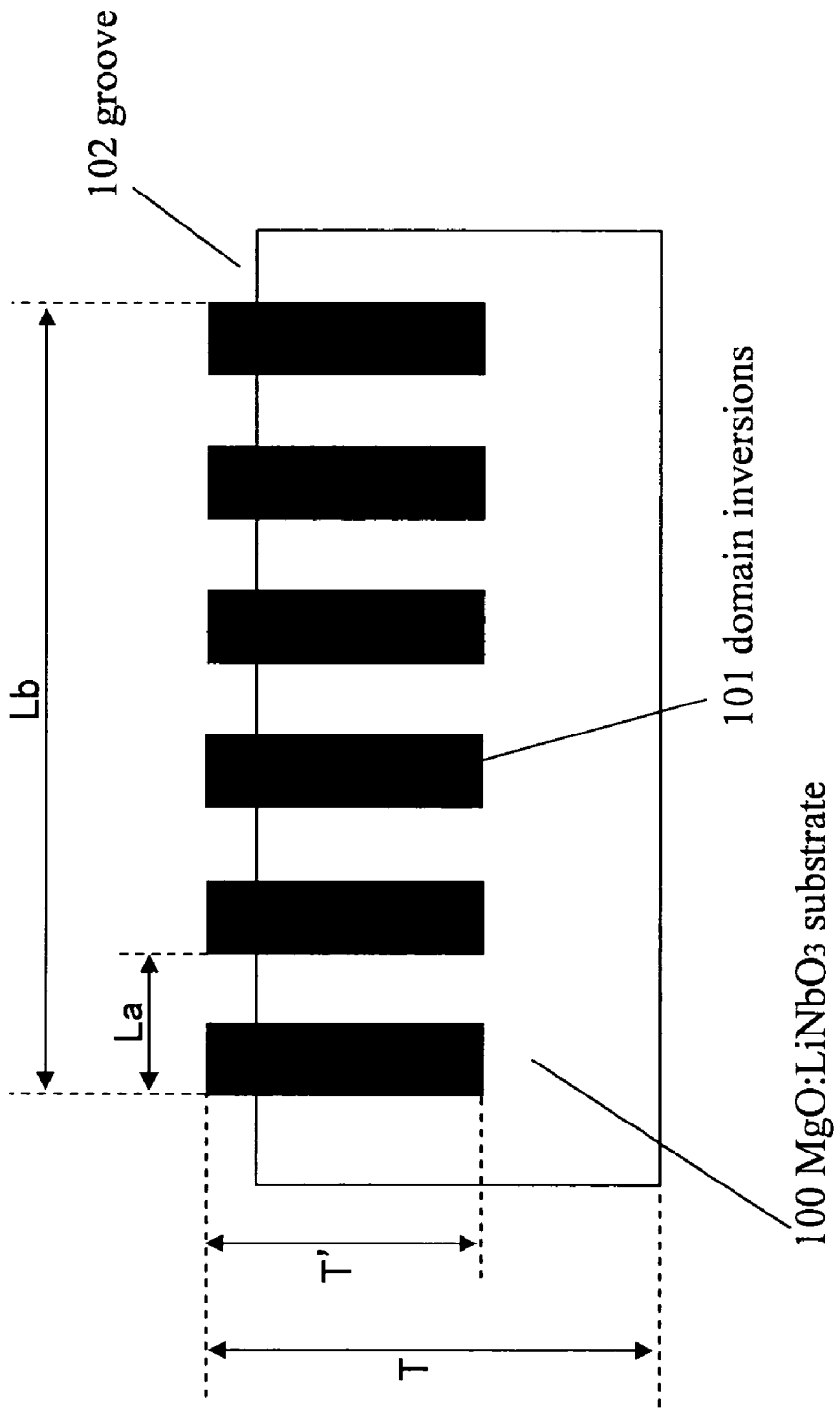
FIG. 1 is a cross section of the optical element of the present invention.

DESCRIPTION OF THE NUMERALS 100, 301, 401, 500, 1001 MgO:LiNbO$_3$ substrate
101, 200, 405, 504 domain inversion
102, 402 groove
302, 1002 main side
303, 501, 601, 700, 800, 1003 first electrode
304, 502, 602, 701, 801, 1004 second electrode
305, 1005 distal end component of first electrode
306, 1006 distal end component of second electrode
307, 503, 603, 702, 802, 1007 third electrode
308, 404, 703, 1008 pulse generator
400 tantalum film
403 SiO$_2$ film
$V_1, V_2, V_3$ potential Ex electric field component in X direction
Ez electric field component in Z direction
Ps spontaneous polarization
A electric field
$L_1$ distance between first electrode and second electrode
Lr length of domain inversion region
T substrate temperature

DETAILED DESCRIPTION OF PREFERRED EMBODIMENTS

First, before describing embodiments of the present invention, the domain inversion of a ferroelectric will be described.

A ferroelectric has a charge bias due to spontaneous polarization in its crystals. The direction of the spontaneous polarization in a ferroelectric can be changed by applying an electric field facing the spontaneous polarization.

The direction of the spontaneous polarization varies with the type of crystal (material). Crystals of $LiTaO_3$, $LiNbO_3$, and so forth, or a mixed crystal of those crystals such as an $LiTa_{(1-x)}Nb_xO_3$ ($0 \leq x \leq 1$) substrate, have spontaneous polarization only in the C axis direction. Accordingly, with these crystals, polarization only occurs in one of two ways: the positive direction along the C axis, or in the negative direction the other way. When an electric field is applied, the polarization of these crystals is inverted by 180 degrees, facing the opposite direction that it had up to then. This phenomenon is called domain inversion. The electric field required to induce domain inversion is referred to as an inversion electric field, and an electric field of about 20 kV/mm is required with crystals of $LiNbO_3$, $LiTaO_3$, or the like, while about 5 kV/mm is required with $MgO:LiNbO_3$ in room temperature.

Giving the ferroelectric crystals a single polarization direction is referred to as "poling." The most common way to achieve this poling is to apply an electric field at a high temperature after crystal growth.

Embodiment 1

In this embodiment, a wavelength conversion element will be described as an optical element having a periodic domain inversion structure in the interior of ferroelectric crystals.

FIG. 1 is a cross section of the optical element of the present invention. Periodic domain inversions 101 are formed in a Z-cut MgLN substrate 100. The substrate is 1 mm thick, and the domain inversion is about 0.5 mm deep. The domain inversion is formed along the Y axis of the substrate crystals (perpendicular to the cross sectional plane in FIG. 1). The domain inversions 101 are formed from the +Z plane of the substrate toward the −Z plane side (in FIG. 1, the direction perpendicular to the layout direction of the domain inversion in the cross section). The domain inversions 101 are formed so as to be shorter than the thickness of the substrate. More specifically, they are formed such that the depth T' of the domain inversions 101 is less than the substrate thickness T. The "depth T' of the domain inversions 101" here means the length of the domain inversions 101 in the substrate thickness direction, and the "substrate thickness T" means the length from the end of the domain inversions 101 on the +Z plane side to the −Z plane. Specifically, the domain inversions 101 are formed such that they do not go all the way through the substrate. A groove 102 with a depth of 0.5 μm is formed in the +Z plane surface of the MgLN near the periodic domain inversions 101. The domain inversion period La (the layout direction spacing between the same positions on two adjacent domain inversion regions, such as the spacing between domain inversion regions from one side in the layout direction to the next) and the domain inversion region length Lb (the length of all the domain inversion regions from one side to the other in the layout direction) are 4 μm and 10 mm, respectively.

Figure 2:
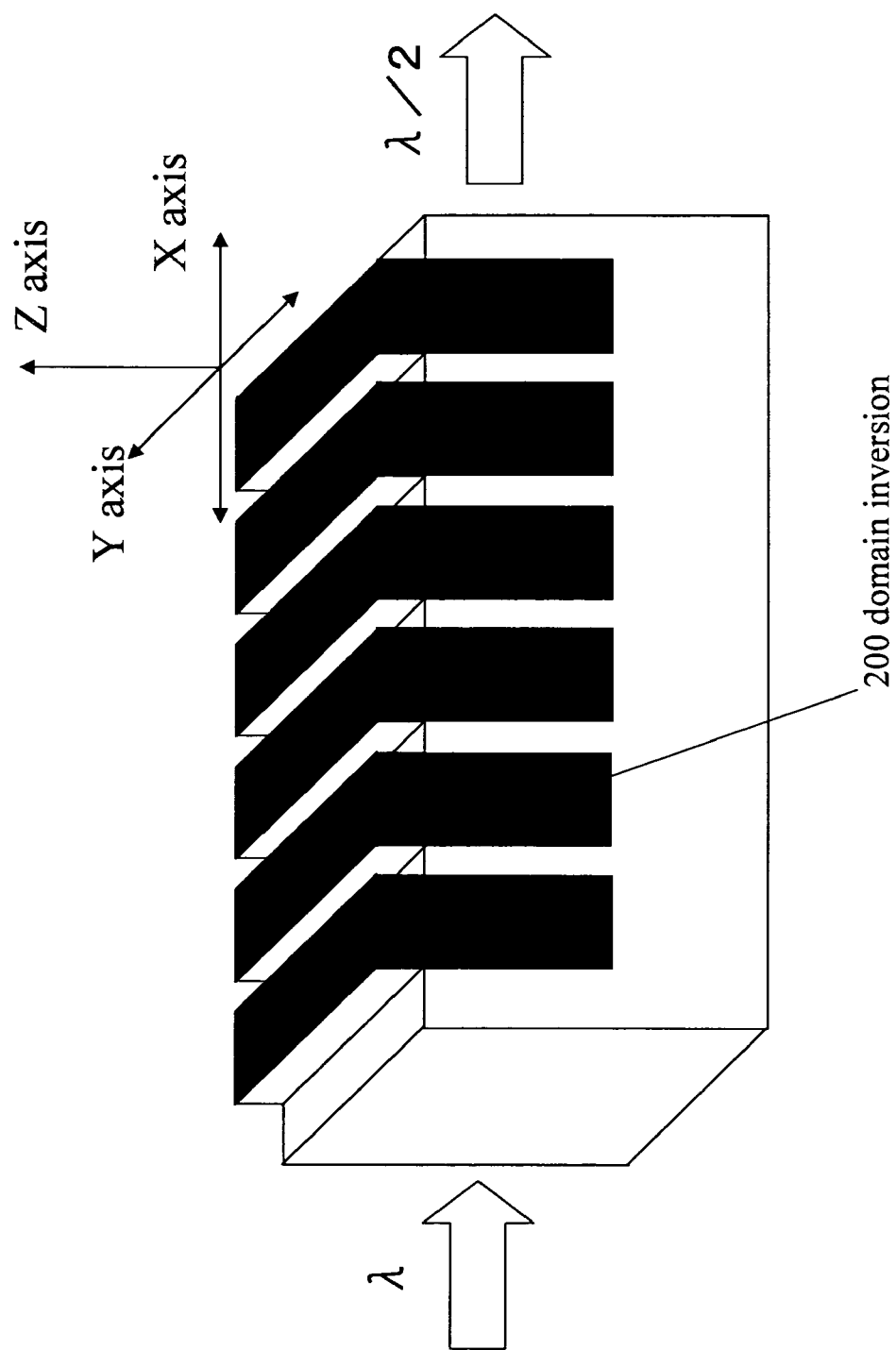
FIG. 2 is an oblique view of the optical element of the present invention.

FIG. 2 is an oblique view of the structure of the optical element shown in FIG. 1. This optical element uses a periodic domain inversion structure to convert the wavelength of a fundamental wave with a wavelength λ into a higher harmonic wave with a wavelength of λ/2. Here, the domain inversion period La is formed as 4 μm, so light with a wavelength of 900 nm is converted into light with a wavelength of 450 nm. When a lens caused light of 900 nm to be incident on the portion of the domain inversion region length Lb, the wavelength was converted at a conversion efficiency of 5%/W, which gave a higher harmonic wave of 450 nm.

Thus, with the present invention it is possible to convert a wavelength at high efficiency by forming uniform domain inversion regions. Furthermore, if the substrate thickness is 1 mm or more, the fundamental waves and higher harmonic waves will have a larger beam waist. This means that the power density of the light can be reduced, and higher output characteristics can be obtained. Using a substrate with a thickness of 1 mm afforded an output four times as high as when the substrate was only 0.5 mm thick.

Also, with the present invention, it is possible to form a domain inversion structure with uniform, short periods by forming the domain inversion in the Y axis direction. More specifically, it is possible to form a domain inversion structure with a period of 2 μm or less, and ultraviolet light with a wavelength of 400 nm or less can be generated. With prior art, when domain inversion was formed in the X axis direction, it was difficult to form a domain inversion structure with a short period, so only light with a wavelength of 500 nm or greater could be obtained. With the present invention, however, short-wavelength light can be generated by using the Y axis direction.

FIG. 1 shows a structure in which none of the domain inversions 101 goes all the way through the substrate, but the present invention is not necessarily limited to this structure. For instance, if the depth of some of the domain inversions is shallower than the thickness of the substrate and the proportion of domain inversion regions that go all the way from the front to the back can be kept to less than half (50%) of all the domain inversion regions, this will be effective in forming a uniform domain inversion structure. Keeping this proportion to 10% or less results in an even more uniform domain inversion structure. Uniformity will be particularly good if the proportion of domain inversion regions that go all the way through is kept to 5% or less. With the present invention, ultraviolet light with a wavelength of 400 nm or less can be generated, and a domain inversion period of 2 μm or less can be obtained, by limiting the length of the domain inversion regions in the depth direction.

With prior art, when a periodic domain inversion structure is formed, different spontaneous polarizations are adjacent at the boundary between domain inversion regions, and a polarization wall is formed with high crystal strain. Consequently, with prior art, as the domain inversion structure is made finer, there is an increase in the amount of strain within the crystals. Strain at a polarization wall is generally a cause of instability in the domain inversion regions. In view of this, it is possible to form a uniform domain inversion structure if domain inversion regions that do not go all the way through are used, as discussed above, but it has become clear that the stability of domain inversion regions that do not go all the way through is greatly inferior as compared to when the domain inversion regions do go all the way through. For example, it was observed that some of the domain inversion regions disappeared when they were irradiated with ultraviolet light of 400 nm or less, or when they were subjected to a sudden temperature change, or when they were subjected to an external electric field. Therefore the characteristics were seen to deteriorate after heat shock or high-output UV light generation. This is particularly pronounced when the domain inversion has a fine shape, and occurs from the domain inversion regions or particularly from the substrate surface, and various methods for preventing this have therefore been examined. As a result, it was found that stability is greatly increased by forming a groove between the domain inversion regions and providing a step between the domain inversion portions and non-domain inversion portions, as with the present invention. The depth of the groove was preferably at least 0.5 µm, as in this embodiment. On the other hand, there was almost no effect below 0.2 µm. The deeper the groove, the better the effect, but when the depth was at least 0.5 µm, no change in characteristics was observed even after 100 cycles of a heat cycle test between −40 and 80° C. Accordingly, providing a groove of at least 0.5 µm to the substrate surface between domain inversion regions is an effective way to improve the reliability of a domain inversion structure.

With prior art, strain remains in the polarization walls when fine domain inversion regions are formed. This strain creates a refractive index distribution in the polarization walls. Since a refractive index distribution is produced in the polarization walls when periodic domain inversion regions are formed, a periodic refractive index distribution is formed. For example, when a domain inversion structure is used in an optical element, a periodic refractive index change disrupts the wave front of the light propagating through the domain inversion structure, and is a source of increased scattering loss. In contrast, it was found that the refractive index distribution is reduced in the polarization walls by providing a groove between the domain inversion regions as in this embodiment. An optical element with low optical loss could be formed as long as the depth of the groove was at least 1 µm.

With the optical element of the present invention, it was possible to suppress excessive growth of the domain inversion in the period direction by forming a groove. In the past, when domain inversion was formed that was long in the depth direction of the domain inversion (the Z axis direction) and the direction perpendicular to the period (the Y axis direction), there was excessive spreading of the domain inversion in the period direction (the X axis direction), which made it difficult to form domain inversion regions over a wide range. On the other hand, when a groove is formed as in the present invention, it suppresses excessive growth of the domain inversion in the period direction, allowing uniform, periodic domain inversion regions to be formed over a wide range even at a short period (particularly a period of 2 µm or less). Accordingly, the optical element of the present invention has the effect that it is easy to produce domain inversion regions, and particularly domain inversion regions with a period of 2 µm or less, uniformly and over a wide range, and is therefore also practical in terms of production.

A wavelength conversion element was described above as an example of an optical element that makes use of a domain inversion structure, but a polarizer can be constituted by forming the domain inversion structure in the shape of a prism or a grating. This polarizer can be used for a phase shifter, light modulator, lens, or the like. Also, a refractive index change resulting from an electro-optical effect can be produced by applying voltage to domain inversion regions. Therefore, an optical element that makes use of this can be obtained. For instance, a refractive index change can be controlled with an electric field, so an optical element in which a refractive index change has been formed can be applied to a switch, a polarizer, a modulator, a phase shifter, a beam shaper, or the like. The method of the present invention for forming domain inversion regions makes it possible to form domain inversion in a fine shape, which affords higher performance in these optical elements.

The thickness of the substrate is preferably at least 0.5 mm. If the substrate is at least 0.5 mm thick, this will prevent the domain inversions from going all the way from the front to the back. The penetration of the domain inversion will be further prevented if the thickness of the substrate is at least 1 mm. It is therefore possible to form more uniform domain inversion regions. On the other hand, since the domain inversion regions do not go all the way through a thick substrate, instability of the domain inversion regions results in lower reliability. With the present invention, a groove is provided between the domain inversion regions to prevent this, and this groove is effective at maintaining the stability of the domain inversion regions.

In the above description of this embodiment, a Z-cut MgO-doped $LiNbO_3$ substrate is used as a ferroelectric substrate. Alternatively, this may be an MgO-doped $LiTaO_3$ substrate, a neodymium-doped $LiNbO_3$ substrate, a KTP substrate, a $KNbO_3$ substrate, a neodymium- and MgO-doped $LiNbO_3$ substrate, a neodymium- and MgO-doped $LiTaO_3$ substrate, the same substrates with a stoichiometric composition, or the like. Also, the substrate is not limited to a Z-cut, and the same effect will be obtained with an X-cut or Y-cut.

Of these substrates, laser oscillation is possible with a substrate composed of crystals doped with neodymium, so the generation of fundamental waves by laser oscillation can be performed simultaneously with the generation of second harmonic waves by wavelength conversion. Therefore, a short-wavelength light source having efficient and stable operating characteristics can be constituted.

Embodiment 2

In this embodiment, a method for forming domain inversion regions by using Z-cut MgLN with a thickness of 1 mm will be described. The method for forming domain inversion regions described in this embodiment is a method for forming domain inversion regions over a wide range by alternately disposing the fingers of two independent electrodes in the +Z plane of an MgLN substrate having a main side perpendicular to the Z axis, and applying voltage to these electrodes.

The method for forming domain inversion regions of this embodiment will now be described. In this embodiment, a method for forming domain inversion regions with a period of 4 µm is discussed.

First, as shown in FIG. 3, a first electrode 303 (an interdigital electrode having teeth (fingers) at a period of 8 µm) having a plurality of distal end components (electrode fingers) 305 extending in the Y axis direction, and a second electrode 304 (an interdigital electrode having teeth (fingers) at a period of 8 µm) having a plurality of distal end components (electrode fingers) 306 extending in the Y axis direction, are formed on the main side 302 of an MgO:$LiNbO_3$ substrate 301. The distal end components 305 and the distal end components 306 lie in the same plane and form periodic electrodes in the X axis direction (see FIG. 2). More specifically, the distal end components 305 of the first electrode 303 and the distal end components 306 of the second electrode 304 are alternately disposed so that their Y axis direction positions overlap. That is, the distal end components are alternately disposed so that they overlap when viewed in the X axis direction. As a result, the distal end components 305 and the distal end components 306 form periodic electrodes with a period of 4 μm in the X axis direction in the same plane. Also, the distal end components 305 of the first electrode 303 and the distal end components 306 of the second electrode 304 are facing in the Y axis direction of the crystals. Furthermore, the first electrode 303 and the second electrode 304 are electrically insulated from each other. Also, a third electrode 307 is formed on the opposite side from the main side 302. Domain inversion regions are formed between the electrodes by applying voltage, controlled by a pulse generator 308, between the first electrode 303 or second electrode 304 and the third electrode 307 formed on the other side.

The method for forming these electrodes 303 and 304 will be described through reference to FIG. 4.

These electrodes 303 and 304 are formed on a tantalum film 400 with a thickness of 100 nm, for example. A periodic electrode comprising the first electrode 303 and the second electrode 304 is formed by depositing a resist over a tantalum film and patterning the resist by reactive ion etching in a $CF_4$ gas atmosphere (see FIG. 4a). By the same procedure, a third electrode 307 (see FIG. 3b) is formed over the entire side or just the portion corresponding to at least the electrodes 303 and 304, on the opposite side from the main side 302. The third electrode 307 is also formed from a tantalum film 400, just as are the electrodes 303 and 304.

Next, the surface of the MgLN substrate 401 not covered by the electrodes is etched by reactive ion etching in a $CHF_3$ gas atmosphere (see FIG. 4b). After this, the resist is removed to form a groove 402 in the surface of the MgLN substrate 401. The groove depth formed by etching here is 0.1 μm.

Then, an $SiO_2$ film 403 is formed as an insulating film on the surface where the groove 402 was formed (see FIG. 4c).

Voltage controlled by a pulse generator 404 is applied between the electrodes formed from the tantalum film 400, which forms domain inversions 405 between the electrodes (see FIG. 4d). This pulse generator 404 has a predetermined voltage level, and is able to apply pulse voltage or DC voltage, as needed, to the MgLN substrate 301.

Here, the MgLN substrate 301 is disposed in an insulating liquid or a vacuum ($10^{-6}$ Torr or lower) before the voltage is applied, in order to avoid discharge during the application of voltage.

The method for applying the voltage will be described in specific terms.

First, pulse voltage is applied between the second electrode 304 and the third electrode 307. Next, pulse voltage is similarly applied between the first electrode 303 and the third electrode 307. This produces domain inversion nuclei under the distal end component 305 of the first electrode 303 and the distal end components 306 of the second electrode 304, and domain inversion regions with a period of 8 μm are formed according to the period at which the distal end components 305 and the distal end components 306 are disposed. The domain inversion nuclei of the distal end components 305 and 306 grow in the Y axis direction and Z axis direction under continuous application of pulse voltage. In the Y axis direction, domain inversion regions are formed in all the portions where the first electrode 303 and second electrode 304 overlap, thereby forming domain inversion regions with a period of 4 μm over a wide range.

Next, the principle behind the method of the present invention for forming a domain inversion structure will be described.

The method of the present invention for forming domain inversion regions is particularly effective with ferroelectric crystals having a metal additive. Magnesium-doped $LiNbO_3$ (hereinafter referred to as MgLN) was used, but the same effect usually happens with crystals doped with a metal in a high concentration of at least 1 mol %. When domain inversion was performed in MgLN by the application of an electric field, it was observed that the resistance of the formed domain inversion regions decreased greatly, by at least three orders of magnitude. Accordingly, it was discovered that with a method for growing domain inversions from the substrate surface toward the back side by forming electrodes on the front and back of Z-cut MgLN and then applying voltage between the electrodes, a large current begins to flow between the electrodes at the point when part of the domain inversion reaches the vicinity of the back side, a drop in voltage occurs between the electrodes, and it becomes difficult to form domain inversion over a large surface area. In other words, at a given potential, resistance between the electrodes greatly decreases as the domain inversions approach the back side, which results in a drop in voltage between the electrodes and halts the growth of domain inversion.

To prevent this, the present invention proposes a method in which the electrodes on the crystal surface are divided into a plurality of regions, and a potential difference is provided between the surface electrodes. Specifically, with the present invention, a different potential difference is produced in at least one of the regions.

Figure 5A:
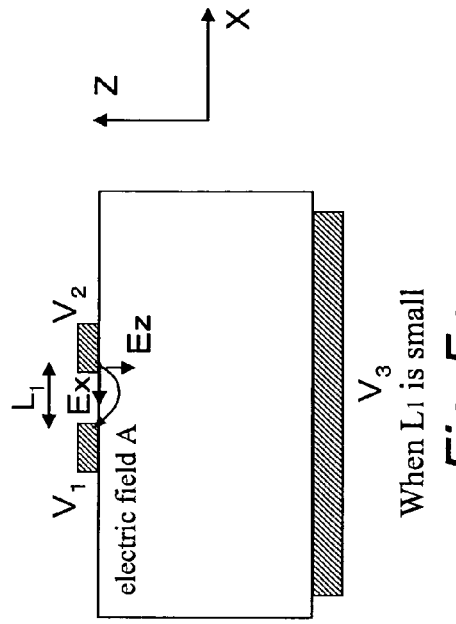
FIG. 5a is an electric field distribution diagram when the potential difference is different.

As shown in FIG. 5a, when a potential difference $V_1-V_2$ is provided between a first electrode 501 (potential $V_1$) and a second electrode 502 (potential $V_2$), an electric field A is generated between the first electrode 501 and the second electrode 502. The vector component Ez in the Z axis direction of the electric field A forms an electric field across from the spontaneous polarization and under the second electrode 502. The direction between the first electrode 501 and the second electrode 502 is perpendicular to the polarization direction in which the domain inversion grows. This avoids a decrease in resistance between the electrodes due to domain inversion allowing the electric field to be applied effectively. As a result, it is possible for a uniform domain inversion structure to be formed over a wide region. Forming regions of different potential on the substrate surface produces an electric field between regions, and having the vector component Ez of this electric field across from the spontaneous polarization makes the formation of domain inversion possible.

Figure 5B:
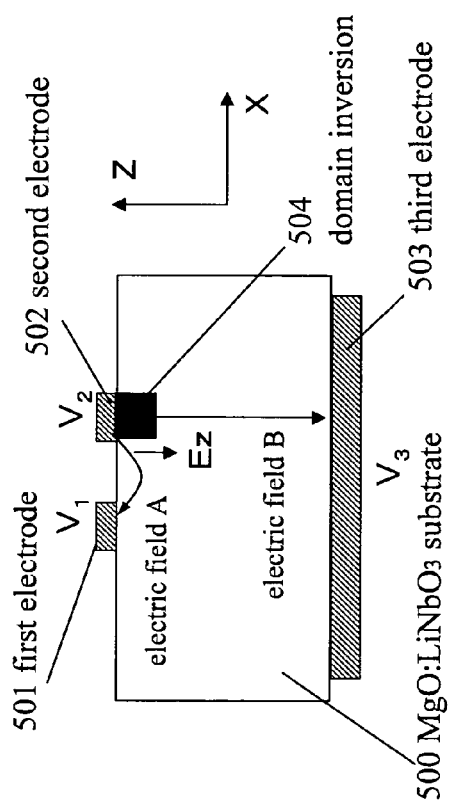
FIG. 5b is an electric field distribution diagram when $L_1$ is large.
Figure 5C:
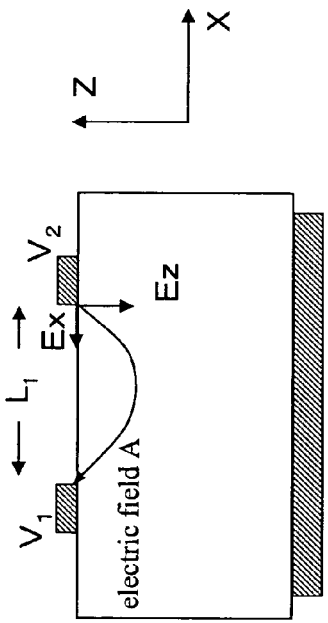
FIG. 5c is an electric field distribution diagram when $L_1$ is small, all in the method for forming domain inversion regions in Embodiment 2.

As shown in FIG. 5b, when the electrode spacing $L_1$ is large, it is possible for a uniform domain inversion structure to be formed by the above method, however, when the electrode spacing $L_1$ is small, as shown in FIG. 5c, the electric field A between the electrodes is as shown in the drawing, with the electric field A distributed substantially horizontally between the electrodes, so the vector component Ez of the Z direction is not large enough. Meanwhile, if the voltage between the electrodes is increased to make the vector component Ez larger, the problem is that insulation breaks down between nearby electrodes. Consequently, if the electrode spacing is less than 5 μm, the problem is that domain inversion by potential difference between surface electrodes becomes extremely difficult.

With the present invention, on the other hand, this problem is solved by using the electrode structure shown in FIG. 6b. Specifically, a groove is made between a first electrode 601 and a second electrode 602, which forms regions of high insulation between the electrodes. Thus, an electric field going from the second electrode 602 toward the first electrode 601 can be generated in a direction that goes under the groove, as shown in FIG. 6b. Compared to FIG. 6a, in which no groove is provided, the electric field component Ez can be greatly increased with the structure in FIG. 6b, in which a groove is provided. Also, it is possible to increase insulation between the first electrode 601 and the second electrode 602, allowing a larger voltage to be applied between the electrodes. Therefore, formation of a more uniform domain inversion structure is also possible. A higher voltage can be applied by using an insulating liquid with high insulation properties, a high-vacuum atmosphere, or the like in the groove provided between the electrodes. With this constitution, domain inversion regions can be formed even in fine regions with an electrode spacing of 5 μm or less. As the groove between the electrodes is deepened, an increase in the electric field vector Ez and insulation between the electrodes are achieved, and it is possible to form a deep domain inversion structure more uniformly. The depth of the groove is preferably no less than 0.1 μm, and 0.5 μm or more is more effective in terms of uniformity and the formation range.

In addition to the above-mentioned effects, forming a groove between the electrodes also allows other effects to be obtained, and allows a fined domain inversion structure to be formed.

Specifically, when domain inversion regions are formed by electric field application, the domain inversion regions grow in the polarization direction and at the same time also grow in the direction perpendicular to polarization. This growth of domain inversion regions in the direction perpendicular to polarization is called side face growth. This side face growth results in the domain inversions growing in the lateral direction of the electrodes. Therefore, even though the domain inversion is formed in a fine electrode shape, the domain inversion regions end up growing in the side face direction, resulting in a shape that is spread out laterally. This spreading to the side faces can extend as far as several microns, making it difficult to form a fine structure of about 1 μm.

In contrast, with the present invention, a groove is formed on the side faces of the electrodes. It was discovered that this holds down the side face growth of domain inversion regions. Domain inversion regions grow from domain inversion nuclei generated directly under the electrode. In general, the side face growth of domain inversion regions is thought to be caused by the generation of domain inversion nuclei by the electric field component generated around the edges of the electrodes. In contrast, with the present invention, providing a groove around the edges of the electrodes suppressed the generation of domain inversion nuclei at the edges of the electrodes and allowed side face growth to be curtailed. As a result, the formation of domain inversion regions of a fine width of 5 μm or less, for example, could be carried out uniformly. Furthermore, even domain inversion regions with a width on the sub-micron order (less than 1 μm) could be easily formed.

The application of different voltages to the surface electrodes was described as the method of the present invention for forming domain inversion regions, but a change in electric field can also be utilized to generate different potential differences between the electrodes.

Figure 7:
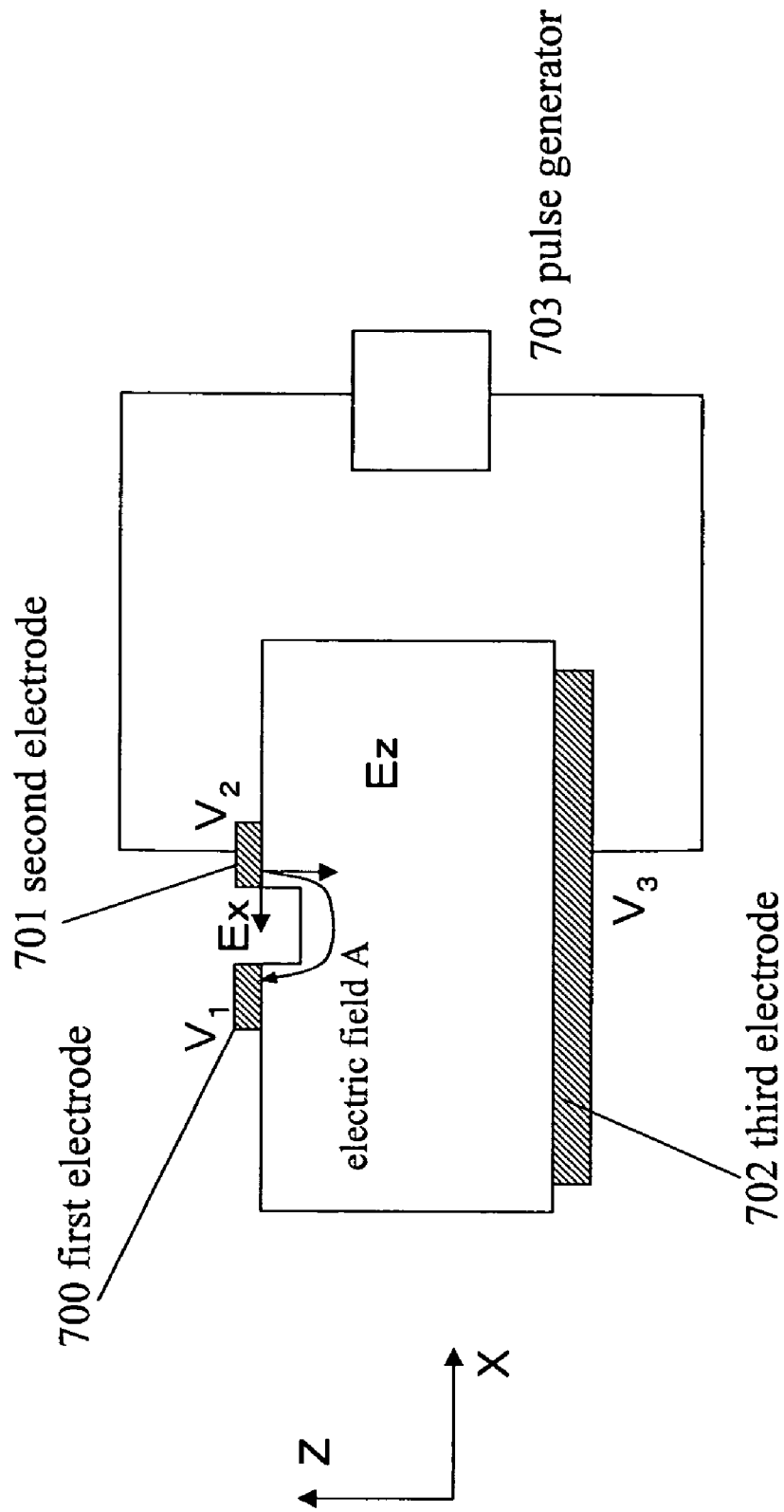
FIG. 7 is a diagram of a structure in which potential differences that differ between electrodes are generated by utilizing a change in electric field, in the method for forming domain inversion regions in Embodiment 2.

For instance, as shown in FIG. 7, when an electric field is applied between a first electrode 701 and a third electrode 702, the electrode structure is that of a capacitor flanked by electrodes. Accordingly, in a transient state in which charges are collected between the electrodes, the first electrode 700 becomes a floating electrode, and an electric field is generated between the first electrode 700 and the second electrode 701. This change in the electric field can be utilized to generate an electric field distribution between the first electrode 700 and the second electrode 701. For example, a transiently generated electric field depends on the amount of change in voltage. Accordingly, it is possible to generate a large electric field between the first electrode 700 and the second electrode 701 with a high-speed voltage change. Although it also depends on the electrode structure, in specific terms, domain inversion can be formed by using a voltage change of at least 100 V/second. Furthermore, a more uniform domain inversion can be formed by using a voltage change of at least 1 kV/second. It is also possible to grow domain inversion regions under both electrodes by alternately applying an electric field to the first electrode 700 and to the second electrode 701.

The waveform of the applied voltage will now be discussed.

Figure 8B:
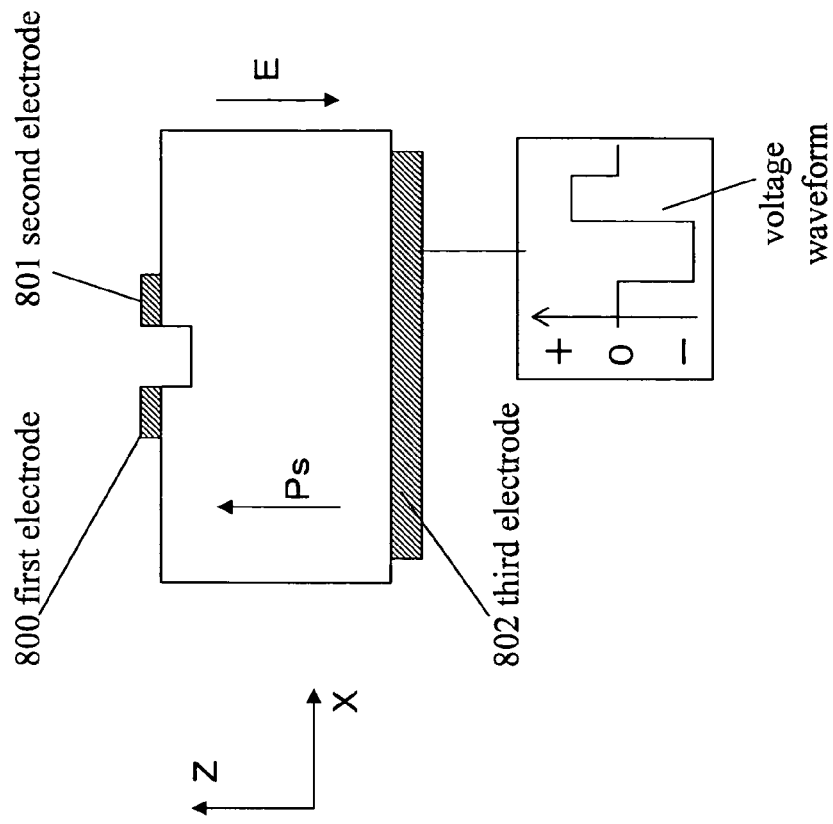
FIG. 8b is a structural diagram of the application of positive voltage, in the method for forming domain inversion regions in Embodiment 2.
Figure 8A:
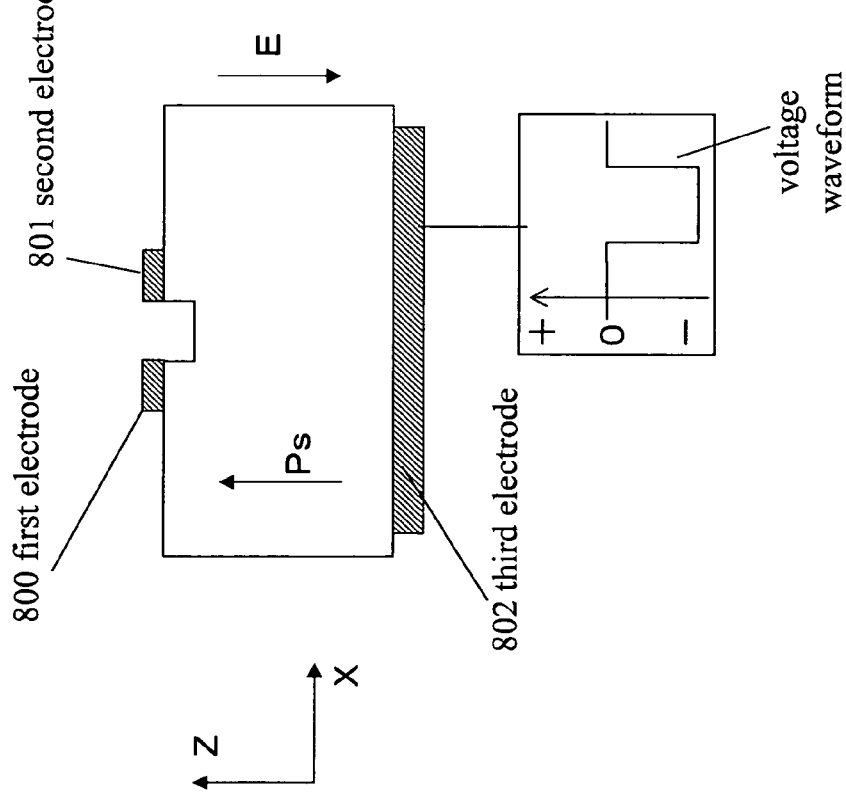
FIG. 8a is a structural diagram of the application of negative voltage.

It is usually preferable for the voltage waveform applied to the electrodes to be voltage that will generate an electric field facing the spontaneous polarization. For example, as shown in FIG. 8a, negative voltage is applied to a third electrode 802 so that an electric field faces the +Z-plane polarization direction Ps between a second electrode 801 and a third electrode 802. When an electric field is applied in the positive direction, the domain inversion that was previously formed is reinverted. Particularly with $LiNbO_3$ or $LiTaO_3$, the presence of an internal electric field dramatically decreases the stability of the domain inversion regions immediately after domain inversion, so the application of opposite-direction voltage must be avoided.

In contrast, it was discovered that magnesium-doped $LiNbO_3$ has characteristics different from those of conventional materials. Specifically, as shown in FIG. 8b, it was discovered that domain inversion can be uniformly formed even if the voltage being applied is a voltage waveform that alternately applies positive and negative voltage. The mechanics of this are as yet unclear, but applying opposite-direction voltage raises the electrical resistance, which prevents the growth of the domain inversion regions from being stopped by lowering the resistance in the domain inversion regions, and serves to perpetuate the growth of the domain inversion regions. Also, if an electric field facing spontaneous polarization is applied in just one direction, the substrate surface will be charged up until a discharge occurs, and the resulting domain inversion will not be uniform, but applying positive and negative electric fields prevents this discharge caused by the charging of the surface, and makes it possible to form a uniform inversion. As to the application conditions, it is preferable for the reverse voltage to be low with respect to the voltage facing the spontaneous polarization, or to use an electric field of the same sign. It is particularly favorable for the applied electric field to be a pulsed application with a pulse width τ of less than or equal to 10 msec. A uniform domain inversion structure can be formed by applying a plurality of pulse trains.

The use of metal electrodes to apply an electric field was described as the method of the present invention for forming domain inversion regions, but the method for applying the electric field is not limited to this. For instance, a similar effect will be obtained by using an electric field application method involving corona discharge, sol-gel electrodes, or liquid electrodes that are utilized in domain inversion.

Furthermore, a Z-cut substrate was used in the embodiments of the present invention, but this is not the only kind of substrate that can be used. For example, in addition to a Z-cut in which the direction of spontaneous polarization is parallel to the normal line of the substrate, it is also possible to use an off-cut substrate in which the direction of spontaneous polarization and the normal line have an angle θ. The value of the angle θ is preferably ±30° or less. In this case, a uniform, deep domain inversion structure can be formed. There is a particular increase in uniformity, and an optical element of high efficiency can be obtained, when the angle θ is ±5° or less.

Furthermore, in this embodiment the domain inversion regions were formed so that the Y axis of the substrate was perpendicular to the period direction of the domain inversion regions. Making the Y axis perpendicular to the period direction of the domain inversion regions allows a short-period domain inversion structure to be formed more uniformly. In particular, a domain inversion structure with a period of 2 μm or less can be formed uniformly. It was difficult to form a short-period domain inversion structure when the domain inversion regions were formed such that the X axis was perpendicular to the period direction of the domain inversion regions.

Furthermore, a substrate with a thickness of 1 mm was used in this embodiment, but the thickness of the substrate is preferably at least 0.5 mm. Using a substrate that is at least 0.5 mm thick prevents the domain inversions from going all the way from the front to the back, and minimizes the decrease in the resistance of the domain inversions. If the thickness is at least 1 mm, penetration by the domain inversion will be further prevented, allowing more uniform domain inversion regions to be formed.

In this embodiment, the amount of charge applied to the electrodes was also investigated. Applying an excess amount of charge was effective at expanding the domain inversion regions under the first electrode 601 and the second electrode 602 (see FIG. 6). If we let Ps be the spontaneous polarization and A the domain inversion area, then the suitable charge amount C is C=2Ps×A. In the present invention, the domain inversion region in the Z axis direction (substrate thickness direction) and Y axis direction (perpendicular to the period) is expanded by applying a charge that is at least 100 times as large as the suitable charge amount C.

Also, with this embodiment, it was explained that the electric field application may be performed in an insulating solution to prevent insulation breakdown during electric field application.

Figure 9:
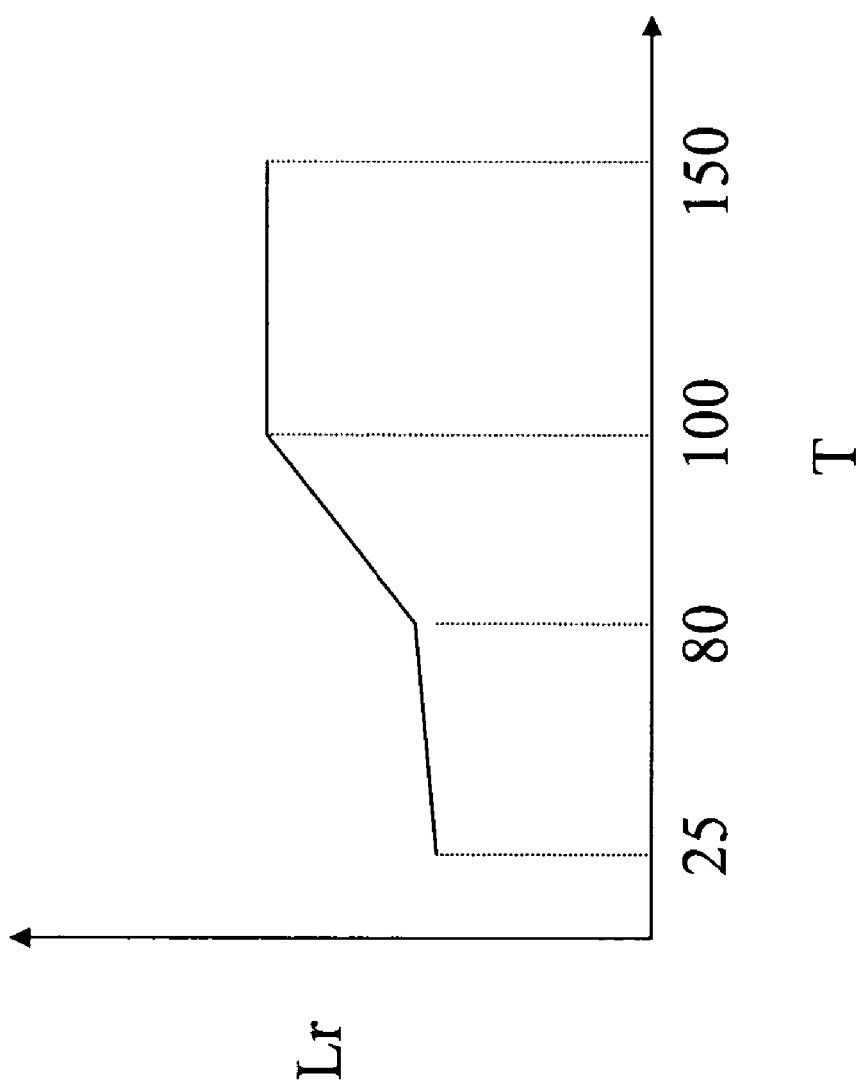
FIG. 9 is a graph of the relation between the temperature of the insulating solution and the length Lr of the domain inversion regions in Embodiment 2.

FIG. 9 is a graph of the relation between the temperature of the insulating solution and the length Lr of a domain inversion region. FIG. 9 shows an increase in the inversion region from around 80° C., and it can be seen that the length Lr of the domain inversion region increases no further above 100° C. The reason for this seems to be that raising the temperature of the MgLN substrate reduces the inversion electric field and facilitates the growth of domain inversion. Also, above 150° C., domain inversion growth in the period direction becomes pronounced and the formation of a short-period (5 μm or less) domain inversion structure of uniform period becomes difficult. Accordingly, the temperature of the insulating solution is preferably 150° C. or lower in order to form short-period domain inversion.

With a magnesium-doped $LiTa_{(1-x)}Nb_xO_3$ ($0 \leq x \leq 1$) substrate, the domain inversion electric field is no more than one-fourth that of ordinary LN. With ordinary LN and the like, the applied voltage causes insulation breakdown when the substrate thickness is increased. With the constitution of the present invention, on the other hand, the voltage applied without causing any insulation breakdown can be increased according to how low the domain inversion electric field is.

The use of Z-cut MgLN was described as the method of the present invention for forming domain inversion. With a Z-cut substrate, since the C axis of the crystals is perpendicular to the substrate, so voltage application featuring an electro-optical effect can be carried out efficiently. Also, the domain inversion is deeper, among other advantages, so such a substrate is ideal for use in bulk-type optical elements. The method of the present invention for forming domain inversion can also be applied to the MgLN of X-cut and Y-cut substrates.

Embodiment 3

In this embodiment, a method for forming domain inversion regions by using Z-cut MgLN with a thickness of 1 mm will be described. In this embodiment is described an optical element formed by this method for forming domain inversion regions.

The method for forming domain inversion regions described in this embodiment is a method for forming domain inversion regions over a wide range by forming two independent electrodes on the +Z side of an MgLN substrate having a main side perpendicular to the Z axis, and applying voltage to each of these electrodes. In particular, this embodiment is characterized in the structure of the electrodes as opposed to that in the above embodiments.

The method for forming domain inversion regions of this embodiment will be described. In this embodiment, a method for forming domain inversion regions with a period of 2 μm is discussed.

First, as shown in FIG. 10, a first electrode 1003 (an interdigital electrode having sets of two teeth (fingers) disposed 2 μm apart at a period of 8 μm) having a plurality of distal end components (electrode fingers) 1005 extending in the Y axis direction, and a second electrode 1004 (an interdigital electrode having sets of two teeth (fingers) disposed 2 μm apart at a period of 8 μm) having a plurality of distal end components (electrode fingers) 1006 extending in the Y axis direction, are formed on the main side 1002 of an MgLN substrate 1001. The distal end components 1005 and the distal end components 1006 lie in the same plane and form periodic electrodes in the X axis direction (see FIG. 2). More specifically, the sets of distal end components 1005 of the first electrode 1003 and the sets of distal end components 1006 of the second electrode 1004 are alternately disposed so that their Y axis direction positions overlap. That is, the sets of distal end components are alternately disposed so that they overlap when viewed in the X axis direction. As a result, the distal end components 1005 and the distal end components 1006 form periodic electrodes with a period of 2 μm in the X axis direction in the same plane.

Since the methods for forming the electrode pattern and the groove are the same as in Embodiment 2, they will not be described again here. The depth of the groove by etching is 0.5 μm in this embodiment.

The distal end components 1005 of the first electrode 1003 and the distal end components 1006 of the second electrode 1004 are facing in the Y axis direction of the crystals. Furthermore, the first electrode 1003 and the second electrode 1004 are electrically insulated from each other.

Also, a third electrode 1007 is formed on the opposite side from the main side 1002. Domain inversion regions are formed between the electrodes by applying voltage, controlled by a pulse generator 1008, between the first electrode 1003 or second electrode 1004 and the third electrode 1007 formed on the other side. This pulse generator has a predetermined voltage level, and is able to apply pulse voltage or DC voltage, as needed, to the MgLN substrate 1001.

Here, the MgLN substrate 1001 is disposed in an insulating liquid or a vacuum ($10^{-6}$ Torr or lower) before the voltage is applied, in order to avoid discharge during the application of voltage.

The method for applying the voltage will be described in specific terms.

First, pulse voltage is applied between the second electrode 1004 and the third electrode 1007. Next, pulse voltage is similarly applied between the first electrode 1003 and the third electrode 1007. This produces domain inversion nuclei under the distal end component 1005 of the first electrode 1003 and the distal end components 1006 of the second electrode 1004, and domain inversion regions with a period of 2 μm are formed according to the period at which the distal end components 1005 and the distal end components 1006 are disposed. The domain inversion nuclei of the distal end components 1005 and 1006 grow in the Y axis direction and Z axis direction under continuous application of pulse voltage. In the Y axis direction, domain inversion regions are formed in all the portions where the first electrode 1003 and second electrode 1004 overlap, thereby forming domain inversion regions with a period of 2 μm over a wide range.

In this embodiment, sets of two teeth each are alternately disposed in the electrode pattern, the effect of which is that the electric field is concentrated at the distal ends of the electrode fingers better than in Embodiment 2, and domain inversion regions were formed under the electrodes. In general, as the space between periodic electrodes narrows, there is a lessening of the concentration of the electric field at the distal ends of the electrode fingers. With the present invention, on the other hand, each electrode has periodic sets of a plurality of electrode fingers, and the two electrodes are formed so that the sets of electrode fingers are alternately disposed. Forming an intersecting pattern such as this (intersecting every two fingers here) allows short-period (2 μm or less) domain inversion to be formed uniformly and over a wide range.

The number of teeth in the sets of electrode fingers is not limited to two. For instance, there may be three, four, or more. The more continuous electrode fingers there are, the greater is the space S between the facing electrodes (more specifically, the greater is the space flanked by the most distal end components of a given set of electrode fingers and the electrode facing these most distal end components in the Y axis direction), so the electric field concentrates more readily at the distal ends of the electrode fingers, and it is easier to expand the domain inversion regions in the depth direction and the electrode finger direction.

Other

The present invention provides an optical element which is furnished with domain inversion regions with which the shape of the domain inversion regions is kept stable and which afford good reliability capable of withstanding a reliability test such as a high temperature test.

The optical element of the present invention can also be used as a highly efficient and stable optical wavelength conversion element or the like having a short-period domain inversion structure in magnesium-doped crystals, for example.

Also, the optical element of the present invention can be used as an optical element applied to a phase modulator, an optical switch, a polarization element, an optical wavelength conversion element, or the like that makes use of a coherent light source used in optical information processing, applied lasermetrics, and other such fields, having domain inversion regions, for example.

The method of the present invention for forming domain inversion regions is an effective means for forming a short-period domain inversion structure, uniformly, stably, and over a wide range, on a thick substrate, and can be employed as a method for manufacturing an optical element equipped with a short-period domain inversion structure, for example. Fine domain inversion regions are formed on such an optical element, and it can be used as an optical wavelength conversion element for generating ultraviolet light or another such optical element.

Also, with the method of the present invention for forming domain inversion regions, control of the pulse waveform of the applied voltage is performed to form uniform domain inversion regions over as wide a range as possible along and under designed electrodes. More specifically, a voltage waveform with a rapid rise and fall is applied. As a result, with the method of the present invention, this transient effect is utilized to allow short-period domain inversion regions to be formed uniformly over a wide range and in a fine pattern.

In general, when electrodes having distal end components are used to form domain inversion in a Z-cut substrate, the voltage concentrates in at the distal end components of the electrodes, so domain inversion is formed very efficiently in these portions. However, the domain inversion portions tend not to spread throughout the entire electrode. In view of this, with the method of the present invention for forming domain inversion regions, the voltage waveform and the electrode structure are devised so as to provide a method with which the domain inversions spread out over as wide a region of the electrodes as possible. Specifically, the formation method of the present invention is extremely effective in the formation of fine domain inversion regions including a uniform and wide-ranging short-period structure.

Industrial Applicability

The optical element pertaining to the present invention is useful in fields that require an optical element furnished with a short-period and wide-ranging domain inversion structure. Also, the method for forming domain inversion regions pertaining to the present invention is useful in fields that require a method for forming short-period and wide-ranging domain inversion regions.

What is claimed is:

1. An optical element, comprising:
   a single-polarized ferroelectric substrate;
   a plurality of domain inversion regions formed in the ferroelectric substrate, the domain inversion regions extending in a thickness direction of the substrate; and
   grooves formed on a surface of the ferroelectric substrate between the domain inversion regions, respectively, such that a portion of each of the domain inversion regions protrudes from the surface of the substrate in the thickness direction,
   wherein a depth T' of at least one of the domain inversion regions satisfies a relation T<T with respect to the a substrate thickness T.

2. The optical element according to claim 1, wherein the at least one of the domain inversion regions that satisfies the relation T'<KT accounts for at least 50% of all of the plurality of domain inversion regions.

3. The optical element according to claim 1, wherein the at least one of the domain inversion regions that satisfies the relation T'<KT accounts for at least 90% of all of the plurality of domain inversion regions.

4. The optical element according to claim 1, wherein a spacing of the domain inversion regions is 5 μm or less.

5. The optical element according to claim 1, wherein a width of the domain inversion regions is 5 μm or less.

6. The optical element according to claim 1, wherein the thickness of the ferroelectric substrate is at least 0.5 μm.

7. The optical element according to claim 1, wherein the ferroelectric substrate is a single-polarized crystal, the at least one of the domain inversion regions has a distal end component in an interior of the surface of the ferroelectric substrate, and a direction of the distal end component is a Y axis direction of the crystal.

8. The optical element according to claim 1, wherein each of the grooves is formed at a depth of at least 0.5 μm from the surface of the ferroelectric substrate.

9. The optical element according to claim 7, wherein each of the grooves is formed at a depth of 10 μm or less from the surface of the ferroelectric substrate.

10. The optical element according to claim 1, wherein the domain inversion regions have periodic domain inversion structures.

11. The optical element according to claim 10, wherein an angle formed by a normal line of the ferroelectric substrate and a direction of spontaneous polarization of the ferroelectric substrate is no more than 30°, and a Y axis of the crystal is at a right angle to a period direction of the domain inversion regions.

12. The optical element according to claim 10, wherein an angle formed by a normal line of the ferroelectric substrate and a direction of spontaneous polarization of the ferroelectric substrate is no more than 30°, the thickness T of the ferroelectric substrate is greater than or equal to 0.5μm, and a period A of the domain inversion regions is less than or equal to 2 μm.

13. The optical element according to claim 1, wherein the ferroelectric substrate is magnesium-doped $LiTa_{(1-x)}Nb_xO_3$ ($0 \leq x \leq 1$).

14. A method for forming domain inversion regions in an interior of a single-polarized ferroelectric crystal substrate, comprising:
    forming grooves on a surface of the ferroelectric substrate so as to divide the surface of the ferroelectric substrate into a plurality of regions between the grooves, respectively; and p1 applying an electric field to the plurality of regions to form domain inversion regions, wherein a direction of the electric field is a direction facing a direction of spontaneous polarization of the ferroelectric substrate, and wherein said applying of the electric field to the plurality of regions produces a potential difference in the plurality of regions.

15. The method for forming domain inversion regions according to claim 14, wherein a depth T'of at least one of the domain inversion regions satisfies a relation T'<T with respect to a substrate thickness T.

16. The method for forming domain inversion regions according to claim 14, wherein the plurality of regions are formed so as to be periodically adjacent, and wherein said applying of the electric field produces mutually different potentials in regions adjacent at a specific period.

17. The method for forming domain inversion regions according to claim 14, wherein in said applying of the electric field to the plurality of regions comprises applying a different electric field to each of the regions.

18. The method for forming domain inversion regions according to claim 14, wherein said applying of the electric field to the plurality of regions comprises applying an electric field that changes with time to any of the plurality of regions.

19. The method for forming domain inversion regions according to claim 18, the change in the electric field with time is at least 1 kY/second.

20. The method for forming domain inversion regions according to claim 14, wherein a width of each of the grooves is 5 μm or less.

21. The method for forming domain inversion regions according to claim 14, wherein a width of each of the regions is 5 μm or less.

22. The method for forming domain inversion regions according to claim 14, wherein a thickness of the ferroelectric substrate is at least 0.5 mm.

23. The method for forming domain inversion regions according to claim 14, wherein said applying of the electric field comprises alternately applying a positive field and a negative field.

24. The method for forming domain inversion regions according to claim 14, wherein said applying of the electric field comprises applying a pulsed electric field having a pulse width of 10 msec or less.

25. The method for forming domain inversion regions according to claim 14, wherein each of the grooves is formed at a depth of at least 0.5 μm from the surface of the ferroelectric substrate.

26. The method for forming domain inversion regions according to claim 25, wherein each of the grooves is formed at a depth of 10 μm or less from the surface of the ferroelectric substrate.

27. The method for forming domain inversion regions according to claim 14, wherein the plurality of regions are formed so as to be disposed alternately at a specific period, and the domain inversion regions are formed at the specific period.

28. The method for forming domain inversion regions according to claim 14, wherein the plurality of regions each have a sub-region group composed of a plurality of subregions disposed at predetermined intervals, the plurality of regions are formed so that the subregion groups are disposed alternately, and the domain inversion regions are formed at the predetermined intervals.

29. The method for forming domain inversion regions according to claim 14, wherein the ferroelectric substrate is magnesium-doped $LiTa_{(1-x)}Nb_xO3$ ($0 \leq x \leq 1$).

30. The method for forming domain inversion regions according to claim 14, wherein the ferroelectric substrate is a substrate composed of X-cut, Y-cut, or Z-cut.

31. The method for forming domain inversion regions according to claim 14, wherein an angle formed by a normal line of the ferroelectric substrate and the direction of spontaneous polarization of the ferroelectric substrate is no more than 3020, the domain inversion regions are formed periodically, and a Y axis of the ferroelectric substrate is at a right angle to a period direction of the domain inversion regions.

32. The method for forming domain inversion regions according to claim 14, wherein a thickness T of the ferroelectric substrate is greater than or equal to 0.5 mm, and ffie a period A of the domain inversion region regions is less than or equal to 2 μ.

33. The method for forming domain inversion regions according to claim 14, wherein said applying of the electric field comprises applying an electric charge of at least 100 times a value of 2PsA, where Ps is the spontaneous polarization of the substrate and A is die a domain inversion surface.

34. The method for forming domain inversion regions according to claim 14, wherein said applying of the electric field is performed in an insulating solution of at least 80° C.

* * * * *